US009777226B2

(12) United States Patent
Pham et al.

(10) Patent No.: US 9,777,226 B2
(45) Date of Patent: Oct. 3, 2017

(54) METHODS AND SYSTEMS FOR SLURRY HYDROCRACKING WITH REDUCED FEED BYPASS

(71) Applicant: UOP LLC, Des Plaines, IL (US)

(72) Inventors: Trung Pham, Mount Prospect, IL (US); Grant Yokomizo, Mount Prospect, IL (US); Robert Haizmann, Rolling Meadows, IL (US)

(73) Assignee: UOP LLC, Des Plaines, IL (US)

( * ) Notice: Subject to any disclaimer, the term of this patent is extended or adjusted under 35 U.S.C. 154(b) by 322 days.

(21) Appl. No.: 14/480,044

(22) Filed: Sep. 8, 2014

(65) Prior Publication Data
US 2016/0068763 A1    Mar. 10, 2016

(51) Int. Cl.
C10G 31/10      (2006.01)
C10G 47/26      (2006.01)
G01F 1/74       (2006.01)
C10G 47/02      (2006.01)

(52) U.S. Cl.
CPC ............. *C10G 47/26* (2013.01); *C10G 31/10* (2013.01); *C10G 47/02* (2013.01); *G01F 1/74* (2013.01); *C10G 2300/4081* (2013.01)

(58) Field of Classification Search
CPC ........ C10G 47/26; C10G 47/02; C10G 31/10; C10G 2300/4081; G01F 1/74
See application file for complete search history.

(56) References Cited

U.S. PATENT DOCUMENTS 3,256,176 A    6/1966  Mills
4,435,280 A    3/1984  Ranganathan et al.
4,457,831 A    7/1984  Gendler
(Continued)

FOREIGN PATENT DOCUMENTS

EP    403087 A1    12/1990

OTHER PUBLICATIONS

Zhou et al., Effect of Vacuum Bottom Residue Recycling on Slurry Bed Hydrocracking of Residue, Acta Petrolei Sinica (Petroleum Processing Section), vol. 17, Issue 4, Aug. 2001, pp. 82-85.
(Continued)

*Primary Examiner* — Randy Boyer
*Assistant Examiner* — Juan Valencia

(57) ABSTRACT

Methods and systems for slurry hydrocracking with reduced feed bypass and methods for modulating an amount of toluene insoluble material present in a slurry hydrocracking reactor are provided. An exemplary slurry hydrocracking method comprises the steps of: combining a hydrocarbon feed and a slurry hydrocracking catalyst or catalyst precursor to generate a slurry hydrocracking feed; introducing the slurry hydrocracking feed to a slurry hydrocracking reactor under hydrocracking conditions suitable to generate a first product stream; drawing a drag stream from the slurry hydrocracking reactor, the drag stream comprising a hydrocarbon, mesophase material, and solid catalyst particles; separating the drag stream into a first separated stream and a recycle stream, with the first separated stream comprising mesophase material and solid catalyst particles, and the recycle stream comprising the hydrocarbon; and directing the recycle stream into the slurry hydrocracking reactor.

19 Claims, 1 Drawing Sheet

(56) References Cited

U.S. PATENT DOCUMENTS

| | | | |
|---|---|---|---|
| 4,663,022 | A | 5/1987 | Gomi et al. |
| 5,120,426 | A | 6/1992 | Johnston et al. |
| 5,374,348 | A | 12/1994 | Sears et al. |
| 6,660,157 | B2 | 12/2003 | Que et al. |
| 8,022,259 | B2 | 9/2011 | Bauer et al. |
| 8,277,638 | B2 | 10/2012 | Bhattacharyya et al. |
| 8,540,870 | B2 | 9/2013 | McGehee et al. |
| 2010/0122932 | A1 | 5/2010 | Haizmann et al. |
| 2010/0122934 | A1 | 5/2010 | Haizmann et al. |
| 2011/0303580 | A1* | 12/2011 | Haizmann ............ C10G 47/26 208/40 |
| 2014/0045679 | A1 | 2/2014 | Gattupalli et al. |

OTHER PUBLICATIONS

Mukherjee et al., Hydroprocessing Revamp Configurations, Petroleum Technology Quarterly, vol. 10, Issue 2, pp. 49-50, 52, 54, 56. 2005,.

Wang et al., Solvent Processing Technology for Slurry-Bed Hydrocracking Bottom Oil of Karamay Residue, Journal of the University of Petroleum, China (Natural Science Edition), v 28, v 1, p. VII, 92-94, 2004; Language: Chinese; ISSN: 10005870; Publisher: Gai Kan Bianjibu.

Drago et al., The Development (by Intevep SA) of the HDH ((Hydrocracking in Slurry Reactor)) Process, a Refiner (PRIME)s Tool for Residual Upgrading, ACS 200th National Meeting (Washington, DC 8/26-31/90) ACS Division of Petroleum Chemistry Preprints V35 N.4 584-92 (1990), 1990.

Wang et al., Upgrading of Residue Oil Slurry Bed Hydrocracking Bottom Oil by Solvent Processing, ACS Division of Petroleum Chemistry, Inc. Preprints, V 48, N 4, p. 344-347, Aug. 2003; ISSN: 05693799; Conference: American Chemical Society, Division of Petroleum Chemistry, Preprints, Sep. 7, 2003—Sep. 11, 2003; Publisher: American Chemical Society (ACS).

Minyard et al., Upgrade FCC Slurry Oil with Chemical Settling Aids, World Refining, v 9, n 7, p. 35-36, 38, Nov./Dec. 1999; ISSN: 10874003; Publisher: Hart.

\* cited by examiner

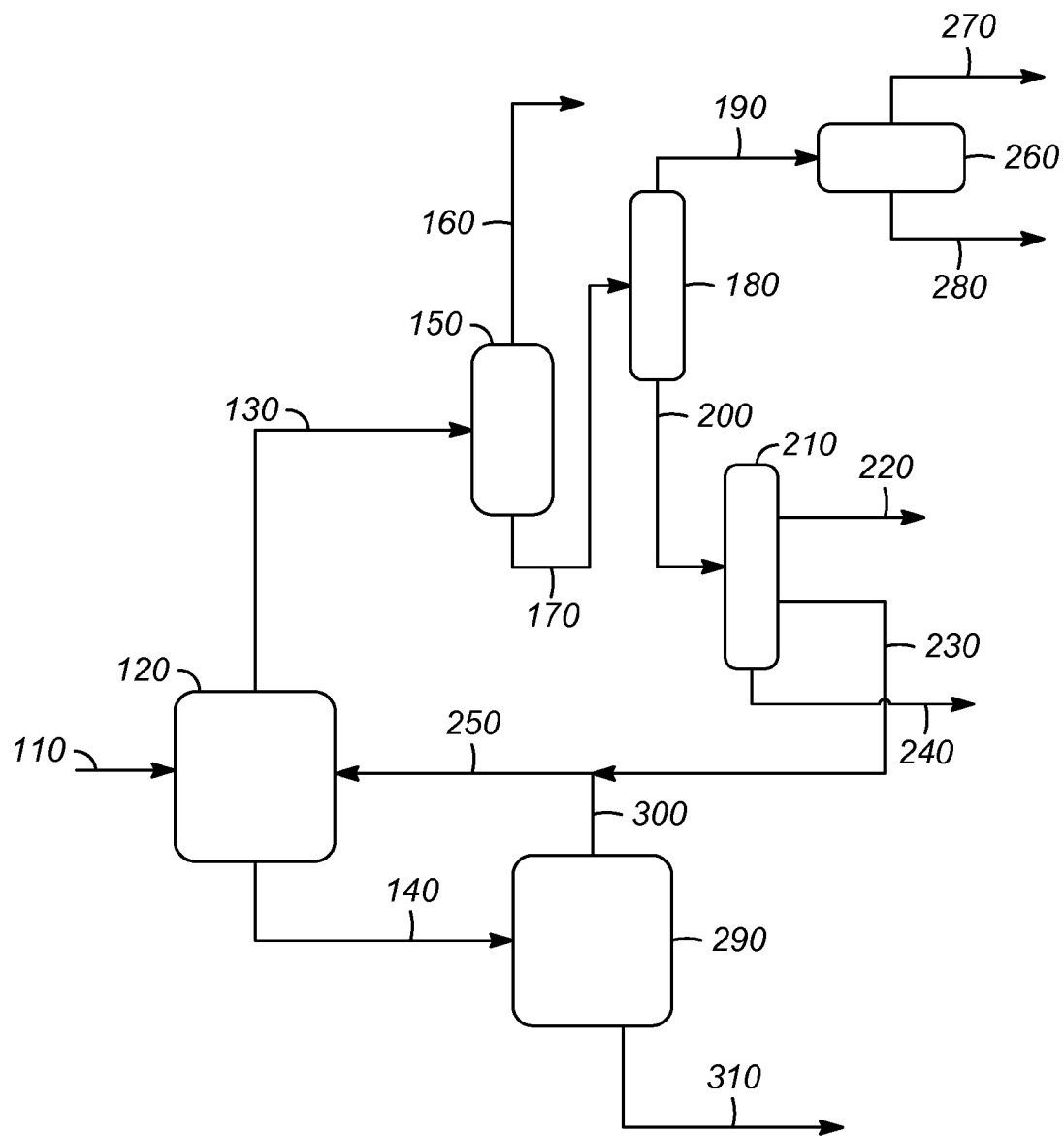

METHODS AND SYSTEMS FOR SLURRY HYDROCRACKING WITH REDUCED FEED BYPASS

TECHNICAL FIELD

The technical field generally relates to slurry hydrocracking, and more particularly to methods and systems for slurry hydrocracking with reduced feed bypass.

BACKGROUND

Slurry hydrocracking methods involve the processing of a heavy feed stock, such as vacuum residues, and fine particulate catalyst in an upflow reactor in a hydrogen-rich environment. This reaction environment facilitates the very high conversion of the heavy feed stock to liquid products, particularly distillate boiling-range components.

A typical slurry hydrocracking method includes introducing a heated heavy feed stock into a slurry hydrocracking (SHC) reactor. An effluent from the SHC reactor is directed to a separation zone (which may include, e.g., vacuum distillation) for recovery of light ends, naphtha, diesel range distillate, vacuum gas oils and unconverted heavy feed (pitch).

Conventional slurry hydrocracking methods, however, present several challenges. For instance, toluene insoluble material can accumulate in the SHC reactor leading to increased coking. Further, an amount of unconverted pitch and vacuum gas oils may leave the SHC reactor before being converted into more desirable components. That is, a portion of the effluent leaving the slurry reactor typically includes an amount of unconverted pitch (that may have a boiling point greater than about 975° C.) and vacuum gas oil that may be as much as 1-3% of the feed.

Accordingly, it is desirable to provide methods and systems that allow for reducing toluene insoluble material, and in particular mesophase materials, in the SHC reactor. In addition, it is desirable to provide methods and systems that reduce feed bypass. Furthermore, other desirable features and characteristics of the present invention will become apparent from the subsequent detailed description of the invention and appended claims, taken in conjunction with the accompanying drawings and this background of the invention.

BRIEF SUMMARY

Methods and systems for slurry hydrocracking with reduced feed bypass, and methods for modulating an amount of toluene insoluble material, and in particular mesophase material, present in a slurry hydrocracking reactor are provided. An exemplary slurry hydrocracking method comprises the steps of: combining a hydrocarbon feed and a slurry hydrocracking catalyst or catalyst precursor to generate a slurry hydrocracking feed, and introducing the slurry hydrocracking feed to a slurry hydrocracking reactor in the presence of hydrogen and under hydrocracking conditions suitable to generate a first product stream comprising one or more of naphtha, middle distillate, light vacuum gas oil, heavy vacuum gas oil, and pitch. A drag stream comprising a hydrocarbon, mesophase material, and solid catalyst particles is also drawn from the slurry hydrocracking reactor. The drag stream is separated into a first separated stream and a recycle stream. The first separated stream comprises mesophase material and solid catalyst particles, and the recycle stream comprises the hydrocarbon. The recycle stream is directed back to the slurry hydrocracking reactor.

In another embodiment, methods of modulating an amount of toluene insoluble material, and in particular mesophase material, present in a slurry hydrocracking reactor are provided. In an exemplary embodiment, a method includes the steps of: introducing a first hydrocarbon hydrogen, and a slurry hydrocracking catalyst into a slurry hydrocracking reactor under hydrocracking conditions suitable to generate a slurry hydrocracking effluent. In this embodiment, the hydrocracking conditions further result in generation of toluene insoluble material, including mesophase material and catalyst solids, in the reactor. A drag stream is drawn from the slurry hydrocracking reactor, wherein the drag stream comprises a second hydrocarbon, mesophase material, and solid catalyst particles. The drag stream is separated into a first separated stream and a recycle stream, with the first separated stream comprising mesophase material and solid catalyst particles, and the recycle stream comprising the second hydrocarbon. The amount of mesophase material and catalyst particles in the recycle stream is reduced relative to an amount present in the drag stream. The recycle stream is directed back to the slurry hydrocracking reactor.

In another embodiment, systems for slurry hydrocracking are provided. In an exemplary embodiment, a system comprises: a slurry hydrocracking reactor configured to receive a slurry under hydroprocessing conditions effective to form a product effluent. The slurry comprises a first hydrocarbon, and the product effluent comprising one or more of naphtha, middle distillate, light vacuum gas oil, heavy vacuum gas oil, and pitch. The slurry hydrocracking reactor is further configured to provide a drag stream from a lower third of the slurry hydrocracking reactor, with the drag stream comprising a second hydrocarbon, mesophase material, and solid catalyst particles. The system also comprises first and second separation zones in fluid communication with the slurry hydrocracking reactor. The first separation zone is configured to fractionate the product effluent into a plurality of product streams. The second separation zone is configured to receive and separate the drag stream into a first separated stream and a recycle stream. The first separated stream comprises mesophase material and solid catalyst particles, and the recycle stream comprises the second hydrocarbon. The slurry hydrocracking reactor and second separation zone are further configured to deliver the recycle stream from the second separation zone to the slurry hydrocracking reactor. In this embodiment, an amount of mesophase material and catalyst particles in the recycle stream is reduced relative to an amount present in the drag stream.

BRIEF DESCRIPTION OF THE DRAWING

The various embodiments will hereinafter be described in conjunction with the following drawing FIGURE, wherein:

FIG. 1 is a block diagram illustrating a system and process for slurry hydrocracking in accordance with an exemplary embodiment.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Various embodiments contemplated herein relate to methods and systems for slurry hydrocracking (SHC) with reduced feed bypass. The exemplary embodiments taught herein generally involve passing a hydrocarbon feedstock through a SHC reaction zone in the presence of hydrogen and a suitable SHC catalyst to generate a SHC effluent stream. In some embodiments, the hydrocarbon feedstock comprises one or more of vacuum residue (VR), atmospheric residue (AR), deasphalted oil (DAO), and clarified slurry oil (CSO), vacuum gas oil (VGO) and coker gas oil (CGO). In some embodiments, the hydrocarbon feedstock is present in a heterogeneous slurry catalyst system in the SHC reactor, in which the catalyst is in the form of a solid particulate. The SHC reaction is carried out in the presence of hydrogen and under conditions suitable to crack at least a portion of the hydrocarbon feedstock to a lighter-boiling SHC distillate fraction that is recovered from the SHC effluent stream in a separation zone. The hydrogen may be provided as fresh hydrogen introduced to the SHC reactor with the hydrocarbon feed stream, and/or may include a hydrogen-rich stream recovered from the SHC effluent stream (e.g., as a gas stream recovered from a high pressure separator).

Representative conventional slurry hydrocracking methods are described, for example, in U.S. Pat. Nos. 5,755,955 and 5,474,977. In some methods, such as those described in U.S. Published Applications 2011/0303580 and 2014/0045679, recovered heavy vacuum gas oil (HVGO) may be at least partially recycled back to the slurry reactor for further conversion. However, the hydrocracking conditions used in these and other conventional slurry hydrocracking methods lead to accumulation of toluene insoluble material in the reactor. Toluene insoluble materials that accumulate in the reactor may include mesophase materials and catalyst solids. The build-up of toluene insoluble materials, and in particular mesophase materials, can lead to coking and feed bypass. Methods and systems described herein utilize a drag stream drawn from a lower portion of the reactor to continuously or intermittently remove toluene insoluble material, including mesophase material, from the reactor during reactor operation. As discussed in detail below, hydrocarbons captured in the drag stream are separated and returned to the reactor, thus reducing feed bypass and increasing conversion and yield.

Referring now to the representative flow scheme shown in FIG. 1, in an embodiment, slurry 110 formed of a heavy hydrocarbon feedstock, hydrogen, and particulate catalyst is introduced into a SHC reaction zone 120. As used herein, the term "zone" can refer to an area of an apparatus or system that includes one or more equipment items and/or one or more sub-zones. Equipment items can include reactors or reactor vessels, heaters, exchangers, pipes, pumps, compressors, controllers, etc. Additionally, an equipment item, such as a reactor, dryer, or vessel, can further include one or more zones or sub-zones.

The SHC reaction zone 120 comprises a SHC reactor, through which the slurry 110 is upwardly passed. The slurry 110 generally has a solid particulate content from about 0.1% to about 10% by weight. The solid particulate content generally comprises a compound of a catalytically active metal, or a metal in elemental form, either alone or supported on a refractory material such as an inorganic metal oxide (e.g., alumina, silica, zirconia, and mixtures thereof). As will be understood by those of skill in the art, other refractory materials, such as carbon, coal, clays, zeolite and non-zeolite molecular sieves, etc., may be used.

Catalytically active metals for use in hydroprocessing include those from Group IVB, Group VB, Group VIB, Group VIIB, or Group VII of the Periodic Table, which are incorporated into the slurry 110 in amounts effective for catalyzing the desired hydrotreating and/or hydrocracking reactions to provide, for example, lower boiling hydrocarbons. Specific representative metals include iron, nickel, molybdenum, vanadium, tungsten, cobalt, ruthenium, and mixtures thereof. The catalytically active metal may be present as a solid particulate in elemental form, or as an organic compound, or an inorganic compound such as a sulfide (e.g., iron sulfide) or other ionic compound. Metal or metal compound nanoaggregates may also be used to form the solid particulates.

In some embodiments it may be desired to form such metal compounds as solid particulates in situ from a catalyst precursor that decomposes or reacts in the hydroprocessing reaction zone environment, or in a pretreatment step, to form a desired, well-dispersed and catalytically active solid particulate. Thus, in some embodiments, the slurry 110 may not comprise a solid particulate catalyst at the time it is introduced into the SHC reaction zone 120. Rather, the solid particulate catalyst may form in the slurry 110, after introduction into the SHC reaction zone 120 and exposure to the hydroprocessing conditions therein.

In some embodiments, a catalyst precursor is a metal sulfate (e.g., iron sulfate monohydrate) that decomposes or reacts to form the catalytically active solid particulate (e.g., iron sulfide). Alternatively, precursors may include oil-soluble organometallic compounds containing the catalytically active metal of interest that thermally decompose to form the solid particulate (e.g., iron sulfide) having catalytic activity. Such compounds are generally highly dispersible in a heavy hydrocarbon feedstock and normally convert under pretreatment or hydroprocessing reaction zone conditions into the solid particulate that is contained in the slurry 110. Other suitable precursors include metal oxides that may be converted to catalytically active (or more catalytically active) compounds such as metal sulfides. In a particular embodiment, a metal oxide containing mineral may be used as a precursor of a solid particulate comprising the catalytically active metal (e.g., iron sulfide) on an inorganic refractory metal oxide support (e.g., alumina). Bauxite represents a particular precursor in which conversion of iron oxide crystals contained in this mineral provides an iron sulfide catalyst as a solid particulate, whereby the iron sulfide after conversion is supported on the alumina that is predominantly present in the bauxite precursor.

The SHC reaction zone 120 includes a SHC reactor operating under conditions to affect the upgrading of the heavy hydrocarbon feedstock to provide a lower boiling component, namely an SHC distillate fraction, in an SHC effluent 130 exiting the SHC reaction zone 120. For example, the SHC reactor may operate at a temperature from about 343° C. (about 650° F.) to about 538° C. (about 1000° F.). In another example, the SHC reactor may operate at a pressure from about 3.5 MPa (about 500 psig) to about 28 MPa (about 4000 psig). In a further example, a SHC reactor may operate at a space velocity from about 0.1 to about 30 volumes of heavy hydrocarbon feedstock per hour per volume of the SHC reactor.

In some embodiments, and as seen in FIG. 1, upon exiting the SHC reaction zone 120, the SHC effluent 130 is directed to a first separation zone 150 where a gas stream 160 (including hydrogen and/or light ends) is separated from a liquid stream 170 of the SHC effluent 130. As used herein, the term "stream" can be a stream including various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. A stream may also include a mixture of aromatic and non-aromatic hydrocarbons. Moreover, hydrocarbon molecules may be abbreviated herein as C1, C2, C3, . . . Cn where "n" represents the number of carbon atoms in the one or more hydrocarbon molecules. In some embodiments, the SHC effluent 130 comprises one or more of naphtha, middle distillate, light vacuum gas oil, heavy vacuum gas oil, and pitch. As used herein, the term middle distillate is used to describe a hydrocarbon stream collected within a cutpoint range of about 204° C. (about 400° F.) to about 343° C. (650° F.). As such, the middle distillate may include hydrocarbons falling within the diesel or kerosene ranges. After separation of the SHC effluent 130 into gas stream 160 and liquid stream 170, liquid stream 170 may comprise one or more of naphtha, middle distillate, light vacuum gas oil, heavy vacuum gas oil, and pitch.

The first separation zone 150 may use any suitable separation technique (e.g., high pressure separation, flash separation, vacuum distillation, etc.). In a particular embodiment, the first separation zone 150 comprises a high pressure separator. Although not shown in FIG. 1, the first separation zone 150 may further include a sub-system for the recovery and recycling of hydrogen from the SHC effluent 130 into the slurry 110.

In some embodiments, and as seen in FIG. 1, liquid stream 170 is directed to a second separation zone 180 for fractionation into a low boiling stream 190 and a high boiling steam 200. The second separation zone 180 may operate under conditions such that the low boiling stream 190 is separated from the high boiling stream 200 at a distillation endpoint above that of naphtha. For instance, the low boiling stream 190 may be recovered as a fraction up to a distillation endpoint temperature of about 204° C. (about 400° F.) to about 399° C. (about 750° F.), and such as about 260° C. (about 500° F.) to about 343° C. (about 650° F.), with the high boiling stream 200 comprising higher boiling compounds from the liquid stream 170. Again, the second separation zone 180 may use any suitable separation technique (e.g., high pressure separation, flash separation, vacuum distillation, etc.). In a particular embodiment, the second separation zone 180 comprises a fractionation column. In some embodiments, the separation zone 180 is operated under conditions such that the lower boiling stream 190 comprises naphtha and one or more hydrocarbons from the middle distillate. In some embodiments, the separation zone 180 is operated under conditions such that the higher boiling stream 200 comprises one or more of one or more hydrocarbons from the middle distillate, light vacuum gas oil, heavy vacuum gas oil, and pitch. As will be understood, the compositions of the low boiling stream 190 and high boiling stream 200 can vary somewhat depending on the separation conditions, e.g., the distillation endpoint temperature, employed.

In some embodiments, and as seen in FIG. 1, high boiling stream 200 is directed to a third separation zone 210 for separation into a light vacuum gas oil (LVGO) stream 220, a heavy vacuum gas oil (HVGO) stream 230, and a pitch stream 240. Again, the third separation zone 210 may use any suitable separation technique (e.g., high pressure separation, flash separation, vacuum distillation, etc.). In a particular embodiment, the third separation zone 210 comprises a vacuum distillation column. In some embodiments, the LVGO stream 220 has a boiling point of about 343° C. (about 650° F.) to about 427° C. (about 800° F.). In some embodiments, the HVGO stream 230 has a boiling point of about 427° C. (about 800° F.) to about 524° C. (about 975° F.). In some embodiments, the pitch stream 240 has a boiling point of greater than about 480° C. (about 900° F.), such as greater than about 523° C. (about 975° F.).

In some embodiments, and as seen in FIG. 1, the HVGO stream 230 is added, at least in part, to a recycle stream 250 for reintroduction into the SHC reaction zone 120. In some embodiments, the recycle stream 250 is directly introduced into the SHC reactor. Alternatively, the recycle stream 250 may be admixed with slurry 110 prior to introduction into the SHC reaction zone 120.

Low boiling stream 190 may optionally be separated into various sub-streams. In some embodiments, the low boiling stream 190 is fractionated, e.g., to yield naphtha and diesel fuel components having varying distillation endpoints. In some embodiments, such as in the exemplary embodiment seen in FIG. 1, the low boiling stream 190 is directed to a fourth separation zone 260, where the low boiling stream 190 is separated, e.g., by extractive distillation with a sulfolane solvent, into an aromatic stream 270 comprising aromatics such as benzene, toluene, and xylene, and a non-aromatic stream 280 comprising paraffinic hydrocarbons, particularly paraffinic hydrocarbons in the gasoline and diesel ranges.

In the methods and systems provided herein, a drag stream 140 is additionally directed from a SHC reactor in the SHC reaction zone 120 to a fifth separation zone 290. In some embodiments, the SHC reactor is configured such that the drag stream 140 is drawn from the bottom third of the SHC reactor, such as from a point at or near the bottom of the SHC reactor. Configured as such, the drag stream 140 contains a large proportion of heavier materials that collect at the bottom of the reactor, such as mesophase material, solid catalyst particles, unreacted feed (including vacuum gas oil), and pitch. The fifth separation zone 290 comprises a separation system that allows for separation of fluids based on a density difference. In an exemplary embodiment, the fifth separation zone 290 comprises a vortex contactor/decanter or a settler/coalescer/precipitator. Vortex contactor/decanters are known in the art and utilize a centrifugal mechanism to separate fluids of different densities. Settler/coalescer/precipitator are also known in the art, and may be used to separate a liquid phase from a solid phase via precipitation and settling of solids entrained in a liquid phase. Thus, in the embodiments provided herein, the fifth separation zone 290 is used to separate the drag stream 140 into a recycle stream 300 comprising pitch and vacuum gas oil and a first separation stream 310 comprising catalyst solids and mesophase material. As a result, the amount of catalyst solids and mesophase material in recycle stream 300 is reduced relative to the amount of those materials in the drag stream 140.

In some embodiments, the amount of catalyst solids and mesophase material in recycle stream 300 is less than about 50%, such as less than about 20%, such as less than about 10%, such as less than about 5%, such as less than about 1%, of the amount of catalyst solids and mesophase material in the drag stream 140. That is, the amount of catalyst solids and mesophase materials in recycle stream 300 is about 0% to about 50%, such as about 0% to about 20%, such as about 0% to about 10%, such as about 0% to about 5%, such as about 0% to about 1%, of the amount of catalyst solids and mesophase material in the drag stream 140. In some embodiments, the presence of catalyst solids and mesophase material in the recycle stream 300 is not avoided entirely. That is, in some embodiments, the amount of catalyst solids and mesophase material in recycle stream 300 is greater than 0%, but less than about 50%, such as less than about 20%, such as less than about 10%, such as less than about 5%, such as less than about 1%, of the amount of catalyst solids and mesophase material in the drag stream 140.

Recycle stream 300 is then directed to the recycle stream 250 for reintroduction into the SHC reaction zone 120. First separation stream 310 is captured for disposal or is optionally subjected to further processing for recapture/recycle of catalyst solids (not shown in FIG. 1). In embodiments where the first separation stream 310 is subjected to further processing for recapture/recycle of catalyst solids, the catalyst solids may be recovered or regenerated and optionally mixed with the fresh catalyst in a catalyst preparation unit (not shown).

In some embodiments, drag stream 140 is continuously pulled from the SHC reaction zone 120. Alternatively, in some embodiments, drag stream 140 is intermittently pulled from the SHC reaction zone 120. In either case, drag stream 140 may be pulled at intervals and amounts sufficient to stabilize and/or reduce the amount of toluene insoluble material, and in particular mesophase materials, present in the SHC reactor. In some embodiments, the drag stream 140 is pulled at intervals and amounts necessary to keep total toluene insoluble material present in the SHC reactor at less than about 25% by weight, such as less than about 10% by weight, such as less than about 5% by weight, of the contents of the SHC reactor. In some embodiments, the drag stream 140 is pulled at intervals and amounts necessary to keep the amount of mesophase materials present in the SHC reactor at less than about 25% by weight, such as less than about 10% by weight, such as less than about 5% by weight, of the contents of the SHC reactor. Prevention of the continued accumulation of toluene insoluble material (and in particular mesophase material) in the SHC reactor helps to avoid coking. This, along with the recycling of stream 300, reduces coking, feed bypass, and improves system/process conversion and yield.

In some embodiments, an aliquot of the drag stream 140 may be collected prior to introduction of the drag stream 140 into the fifth separation zone 290. The collected aliquot may be subjected to any of a variety of analytical techniques including but not limited to ash balance determination, elemental analysis, transmission electron microscopy (TEM), thermogravimetric analysis (TGA), temperature programmed oxidation (TPO), nuclear magnetic resonance (NMR), mass spectroscopy (MS), two-dimensional gas chromatography (GC×GC), high-performance liquid chromatography (HPCL), x-ray diffraction (XRD), polarized light microscopy (PLM), and simulated distillation by gas chromatography (SIMDIS). This analysis of the drag stream 140 provides information to an operator regarding the contents of the SHC reactor. Information gained from this analysis may be used by the operator to determine appropriate flow rates (for continuous or intermittent schemes) and time of flow and time between flows (for intermittent schemes) for the drag stream 140 to achieve a desired level of total toluene insoluble or mesophase material present in the SHC reactor. As indicated above, in some embodiments, the flow rate, time of flow, and time between flows is determined such that the amount of total toluene insoluble or mesophase material present in the SHC reactor is less than about 25% by weight, such as less than about 10% by weight, such as less than about 5% by weight, of the contents of the SHC reactor.

Similarly, in some embodiments, an aliquot of the recycle stream 250 may be collected prior to reintroduction into the SHC reaction zone 120. Again, the collected aliquot may be subjected to any of a variety of analytical analyses including but not limited to ash balance determination, elemental analysis, TEM, TGA, TPO, NMR, MS, GC×GC, HPLC, XRD, PLM, and SIMDIS. Analysis of the recycle stream 250 provides information to the operator regarding the composition of the recycle stream 250 and the SHC reaction zone 120. Such information, alone or in combination with analytical results for the drag stream 140 (if collected), may facilitate adjustment of any of the above described reaction and separation conditions via one or more feedback control loop systems (not shown) to ensure robust and efficient operation.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A slurry hydrocracking method comprising the steps of:
combining a hydrocarbon feed and a slurry hydrocracking catalyst or catalyst precursor to generate a slurry hydrocracking feed;
introducing said slurry hydrocracking feed to a slurry hydrocracking reactor in the presence of hydrogen and under hydrocracking conditions suitable to generate a first product stream comprising one or more of naphtha, middle distillate, light vacuum gas oil, heavy vacuum gas oil, and pitch;
drawing a drag stream intermittently from said slurry hydrocracking reactor, wherein said drag stream comprises a hydrocarbon, mesophase material, and solid catalyst particles;
separating said drag stream into a first separated stream and a recycle stream, wherein said first separated stream comprises said mesophase material and said solid catalyst particles, and said recycle stream comprises said hydrocarbon; and
directing said recycle stream into said slurry hydrocracking reactor.

2. The method of claim 1, wherein separating said drag stream into said first separated stream and said recycle stream is conducted via a centrifugal separation technique or a precipitation/settling technique.

3. The method of claim 1, wherein separating said drag stream into said first separated stream and said recycle stream is conducted using a vortex contactor/decanter or a settler/coalescer/precipitator.

4. The method of claim 1, wherein the amount of said drag stream drawn from said slurry hydrocracking reactor is sufficient to maintain an amount of total mesophase material in the slurry hydrocracking reactor at less than about 25% by weight.

5. The method of claim 1, wherein said hydrocarbon feed comprises one or more of vacuum residue, atmospheric residue, deasphalted oil, clarified slurry oil, vacuum gas oil, and coker gas oil.

6. The method of claim 1, wherein said slurry hydrocracking catalyst comprises solid catalyst particulates.

7. The method of claim 6, wherein said solid catalyst particulates comprises a compound of a metal of Group IVB, Group VB, Group VIIB, Group VIIB, or Group VII, or a combination thereof.

8. The method of claim 1, further comprising fractionating said first product stream into a lower boiling distillate fraction comprising naphtha, and a higher boiling distillate fraction comprising light vacuum gas oil, heavy vacuum gas oil, and pitch.

9. The method of claim 8, further comprising fractionating said higher boiling distillate fraction into a light vacuum gas oil stream, a heavy vacuum gas oil stream, and a pitch stream.

10. The method of claim 9, further comprising recycling said heavy vacuum gas oil stream back to said slurry hydrocracking reactor.

11. The method of claim 8, further comprising separating said lower boiling distillate fraction into an aromatic hydrocarbon stream and a non-aromatic hydrocarbon stream.

12. The method of claim 11, wherein said aromatic hydrocarbon stream comprises one or more of benzene, toluene, and xylene.

13. The method of claim 1, further comprising analyzing an aliquot of said drag stream to provide information regarding the composition of the contents of the slurry hydrocracking reactor.

14. The method of claim 13, further comprising determining a flow rate and time for drawing said drag stream based on the results of said analysis, such that an amount of total toluene insoluble material in the slurry hydrocracking reactor remains at less than about 25% by weight.

15. A method of modulating an amount of mesophase material present in a slurry hydrocracking reactor, the method comprising the steps of:
    introducing a first hydrocarbon, hydrogen, and a slurry hydrocracking catalyst into a slurry hydrocracking reactor under hydrocracking conditions suitable to generate a slurry hydrocracking effluent, wherein said hydrocracking conditions further result in generation of toluene insoluble material in said slurry hydrocracking reactor;
    drawing a drag stream from said slurry hydrocracking reactor, wherein the drag stream comprises a second hydrocarbon, mesophase material, and solid catalyst particles;
    separating said drag stream into a first separated stream and a recycle stream, said first separated stream comprising said mesophase material and said solid catalyst particles, said recycle stream comprising said second hydrocarbon, and wherein an amount of said mesophase material and said solid catalyst particles in said recycle stream is reduced relative to an amount present in said drag stream; and
    directing said recycle stream back to said slurry hydrocracking reactor.

16. The method of claim 15, wherein the drag stream is intermittently drawn from said slurry hydrocracking reactor.

17. The method of claim 15, wherein separating said drag stream into said first separated stream and said recycle stream is conducted via a centrifugal separation technique or a precipitation/separation technique.

18. The method of claim 15, wherein the amount of said drag stream drawn from said slurry hydrocracking reactor is sufficient to maintain an amount of total toluene insoluble material in the slurry hydrocracking reactor at less than about 25% by weight.

19. A slurry hydrocracking method comprising the steps of:
    combining a hydrocarbon feed and a slurry hydrocracking catalyst or catalyst precursor to generate a slurry hydrocracking feed;
    introducing said slurry hydrocracking feed to a slurry hydrocracking reactor in the presence of hydrogen and under hydrocracking conditions suitable to generate a SHC effluent stream comprising one or more of naphtha, middle distillate, light vacuum gas oil, heavy vacuum gas oil, and pitch;
    withdrawing the SHC effluent stream from the slurry hydrocracking reactor;
    withdrawing a drag stream directly from said slurry hydrocracking reactor, wherein said drag stream comprises a hydrocarbon, mesophase material, and solid catalyst particles;
    separating said drag stream into a first separated stream and a recycle stream, wherein said first separated stream comprises said mesophase material and said solid catalyst particles, and said recycle stream comprises said hydrocarbon;
    and directing said recycle stream into said slurry hydrocracking reactor.

* * * * *